(12) United States Patent
Zeuthen

(10) Patent No.: US 10,482,286 B2
(45) Date of Patent: *Nov. 19, 2019

(54) UNIFIED SYSTEM FOR AUTHENTICATION AND AUTHORIZATION

(71) Applicant: Red Hat, Inc., Raleigh, NC (US)

(72) Inventor: David Zeuthen, Somerville, MA (US)

(73) Assignee: Red Hat, Inc., Raleigh, NC (US)

( * ) Notice: Subject to any disclaimer, the term of this patent is extended or adjusted under 35 U.S.C. 154(b) by 313 days.

This patent is subject to a terminal disclaimer.

(21) Appl. No.: 15/331,591

(22) Filed: Oct. 21, 2016

(65) Prior Publication Data

US 2017/0039380 A1 Feb. 9, 2017

Related U.S. Application Data

(63) Continuation of application No. 12/613,980, filed on Nov. 6, 2009, now Pat. No. 9,479,509.

(51) Int. Cl.
| | |
|---|---|
| *G06F 21/62* | (2013.01) |
| *G06F 21/32* | (2013.01) |
| *H04L 29/06* | (2006.01) |
| *G06F 21/30* | (2013.01) |
| *G06F 21/44* | (2013.01) |
| *H04L 9/32* | (2006.01) |

(52) U.S. Cl.
CPC ............ *G06F 21/629* (2013.01); *G06F 21/32* (2013.01); *G06F 21/6281* (2013.01); *H04L 63/102* (2013.01); *G06F 21/30* (2013.01); *G06F 21/44* (2013.01); *G06F 21/445* (2013.01); *G06F 21/62* (2013.01); *H04L 9/3228* (2013.01); *H04L 63/08* (2013.01); *H04L 63/10* (2013.01); *H04L 63/20* (2013.01)

(58) Field of Classification Search
CPC ........ G06F 21/62; G06F 21/629; G06F 21/30; G06F 21/44; G06F 21/445; G06F 21/32; H04L 63/10; H04L 63/102; H04L 63/20; H04L 9/3228; H04L 29/06; H04L 9/32
See application file for complete search history.

(56) References Cited

U.S. PATENT DOCUMENTS

| | | | |
|---|---|---|---|
| 6,775,781 | B1 | 8/2004 | Phillips et al. |
| 7,373,662 | B2 | 5/2008 | Foster et al. |

(Continued)

OTHER PUBLICATIONS

"Fedora 11 Installation Guide: Installing Fedora 11 on x86, AMD64, and Intel® 64 architectures," Ed. 1.0, Fedora Documentaion Project, Fedora-docs-list@redhat.com, Red Flat, Inc. and others, last revised Apr. 1, 2009, 274 pages.

(Continued)

*Primary Examiner* — Jayesh M Jhaveri
(74) *Attorney, Agent, or Firm* — Lowenstein Sandler LLP

(57) ABSTRACT

A request is received from a trusted application to authorize a client application that requests a service offered by the trusted application. In view of the request, it is determined whether the client application is authorized to access the trusted application in view of an authorization policy. An authentication of a user of the client application is caused in response to determining the client application is authorized to access the trusted application. An authorization result is returned to the trusted application in view of the determining and the authentication.

20 Claims, 4 Drawing Sheets

(56) References Cited

U.S. PATENT DOCUMENTS

| | | | |
|---|---|---|---|
| 7,617,530 | B2 | 11/2009 | Ruzyski et al. |
| 8,108,919 | B2 | 1/2012 | Boulos et al. |
| 8,332,912 | B2 | 12/2012 | Naslund et al. |
| 8,798,524 | B2 | 8/2014 | Saros et al. |
| 9,131,382 | B1* | 9/2015 | Johns ............... H04W 12/1208 |
| 10,069,836 | B2* | 9/2018 | Cholas ............... H04L 63/062 |
| 2002/0133605 | A1 | 9/2002 | Khanna et al. |
| 2003/0046589 | A1 | 3/2003 | Gregg |
| 2004/0030887 | A1 | 2/2004 | Harrisville-Wolff et al. |
| 2004/0044905 | A1 | 3/2004 | Heath et al. |
| 2004/0059941 | A1 | 3/2004 | Hardman et al. |
| 2004/0221045 | A1 | 11/2004 | Joosten et al. |
| 2004/0243848 | A1 | 12/2004 | Blackburn et al. |
| 2004/0268145 | A1* | 12/2004 | Watkins ............... G06F 21/57 726/24 |
| 2005/0027995 | A1 | 2/2005 | Menschik et al. |
| 2005/0097351 | A1* | 5/2005 | Patrick ............... G06F 21/6218 726/29 |
| 2005/0154886 | A1* | 7/2005 | Birk ............... H04L 63/0815 713/168 |
| 2006/0021009 | A1 | 1/2006 | Lunt |
| 2006/0048179 | A1* | 3/2006 | Kortum ............... G06F 21/31 725/30 |
| 2006/0059564 | A1 | 3/2006 | Tan et al. |
| 2006/0150256 | A1 | 7/2006 | Fanton et al. |
| 2006/0174309 | A1 | 8/2006 | Pearson |
| 2006/0225132 | A1 | 10/2006 | Swift et al. |
| 2007/0073621 | A1 | 3/2007 | Dulin et al. |
| 2007/0118878 | A1 | 5/2007 | Sastry et al. |
| 2007/0185992 | A1 | 8/2007 | Simpson |
| 2007/0189279 | A1 | 8/2007 | Thalanany et al. |
| 2007/0226784 | A1 | 9/2007 | Ueda et al. |
| 2007/0255841 | A1 | 11/2007 | Chong |
| 2008/0134286 | A1 | 6/2008 | Amdur et al. |
| 2008/0141339 | A1* | 6/2008 | Gomez ............... H04L 63/08 726/1 |
| 2008/0172737 | A1 | 7/2008 | Shen et al. |
| 2008/0250253 | A1 | 10/2008 | Beckwith et al. |
| 2008/0279200 | A1 | 11/2008 | Shatzkamer et al. |
| 2009/0019533 | A1 | 1/2009 | Hazlewood et al. |
| 2009/0292797 | A1 | 11/2009 | Cromp et al. |
| 2009/0292814 | A1* | 11/2009 | Ting ............... G06F 15/16 709/229 |
| 2010/0064349 | A1 | 3/2010 | Randle et al. |
| 2010/0100950 | A1 | 4/2010 | Roberts |
| 2010/0125612 | A1 | 5/2010 | Amradkar et al. |
| 2010/0211375 | A1 | 8/2010 | Gersten et al. |
| 2010/0306830 | A1 | 12/2010 | Hardt |
| 2011/0055906 | A1 | 3/2011 | Rozek et al. |
| 2011/0107436 | A1 | 5/2011 | Cholas et al. |
| 2011/0145899 | A1 | 6/2011 | Cao et al. |
| 2012/0158542 | A1 | 6/2012 | Nahari |

OTHER PUBLICATIONS

"Fedora 11 User Guide: Using Fedora 11 for common desktop computing tasks," Ed. 1.0, Fedora Documentation Project, fedora-docs-fist@redhat.com, Red Hat, Inc. and others, last revised Apr. 23, 2009, 118 pages.

Matic, Davor, "Xnest—a nested X server," MIT X Consortium, 5 pages, retrieved from the XFree86 Project, Inc. website: http://www.xfree86.org/4.0/Xnest.1.html, Dec. 2009.

"Multiseat Configuration/Xephyr," May 11, 2009, 9 pages, Wikibooks website, retrieved from http://en.wikibooks.org/wiki/Multiseat_Configuration/Xephyr in Mar. 2010.

Russinovich, Mark, "Security: Inside Windows Vista User Account Control," TechNet Magazine, Jun. 2007, pp. 1-14, Microsoft Corporation and CMP Media. Retrieved from http://207.46.16.252/en-us/magazine/2007.06.uac.aspx in Mar. 2010.

"Understanding and Configuring User Account Control in Windows Vista," Microsoft TechNet, Microsoft Corporation, 55 pages, retrieved from http://technet.microsoft.com/en-us/library/cc709628(WS.10.printer).aspx in Dec. 2009.

Melber, Derek, "Understanding User Account Control in Vista," WindowSecurity.com, published Aug. 23, 2006, 5 pages, downloaded from http://www.windowsecurity.com/articles-tutorials/authentication_and_encryption/Understanding-User-Account-Control-Vista.html on Oct. 5, 2016.

* cited by examiner

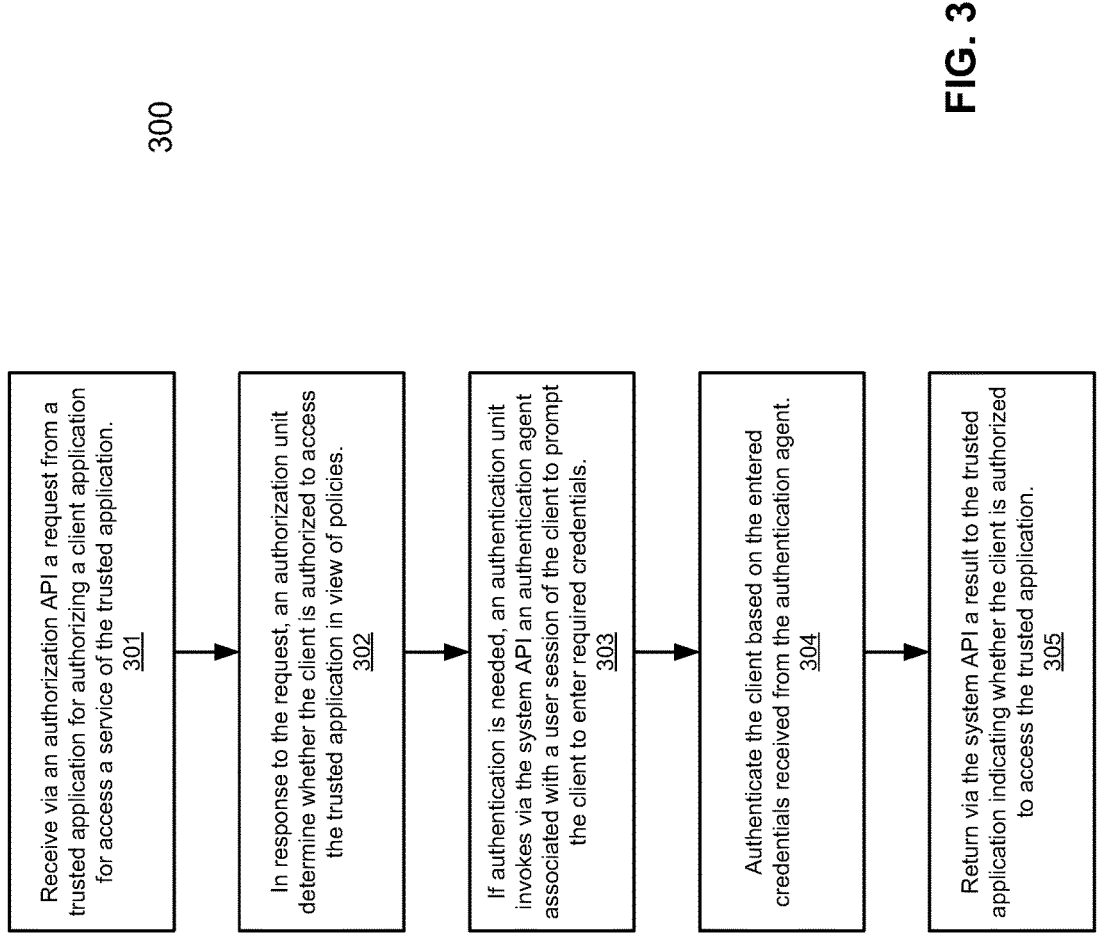

UNIFIED SYSTEM FOR AUTHENTICATION AND AUTHORIZATION

RELATED APPLICATIONS

The present application is a continuation of U.S. patent application Ser. No. 12/613,980 filed Nov. 6, 2009, which is incorporated by reference herein.

TECHNICAL FIELD

The present invention relates generally to security of data processing systems. More particularly, this invention relates to a unified system interface for authentication and authorization.

BACKGROUND

Traditionally operating systems, such as a UNIX operating system (OS), have a clear distinction between ordinary unprivileged users and the powerful super user with a "root" privilege. However, in order for a user to access and configure hardware additional privileges and rights are needed. This has been done in a number of often OS-specific ways. For example, some systems usually grant access to devices to a user if, and only if, the user is logged in at a local console. In contrast, other systems often relies on group membership, e.g. users in the "cdrom" group can access optical drives; users in the "plugdev" group can mount removable media; and so on.

Traditionally, authentication and authorization are two distinctive processes that require separate processing entities. There has been a lack of an efficient way for authenticating and authorizing a user session for accessing a privileged application.

BRIEF DESCRIPTION OF THE DRAWINGS

The present invention is illustrated by way of example and not limitation in the figures of the accompanying drawings in which like references indicate similar elements.

FIG. 3 is a flow diagram illustrating a method for authorizing access of a privileged application according to one embodiment.

DETAILED DESCRIPTION

In the following description, numerous details are set forth to provide a more thorough explanation of the embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to some embodiments, an interface is provided for privileged or trusted applications to access an authorization framework in determining whether a particular client (e.g., untrusted application) communicating with the privileged/trusted application can access a service provided by the privileged/trusted application. The actual decision-making process (e.g., authorization and/or authentication) is hidden from the privileged/trusted application. In authorizing a client, one implementation could read authorization policy from a local disk and another implementation could read authorization policy from a trusted directory server over a network, dependent upon a specific configuration. In addition, an authentication interface is provided to allow a user to gain temporary authorization by authenticating the user itself or as an administrator or a super user. Thus, the authorization framework is implemented combining the functionalities of authorization and authentication in a unified application programming interface (API), which is may be implemented as an inter-process call (IPC) or system bus message mechanism (e.g., D-bus or UNIX pipes).

Figure 1:
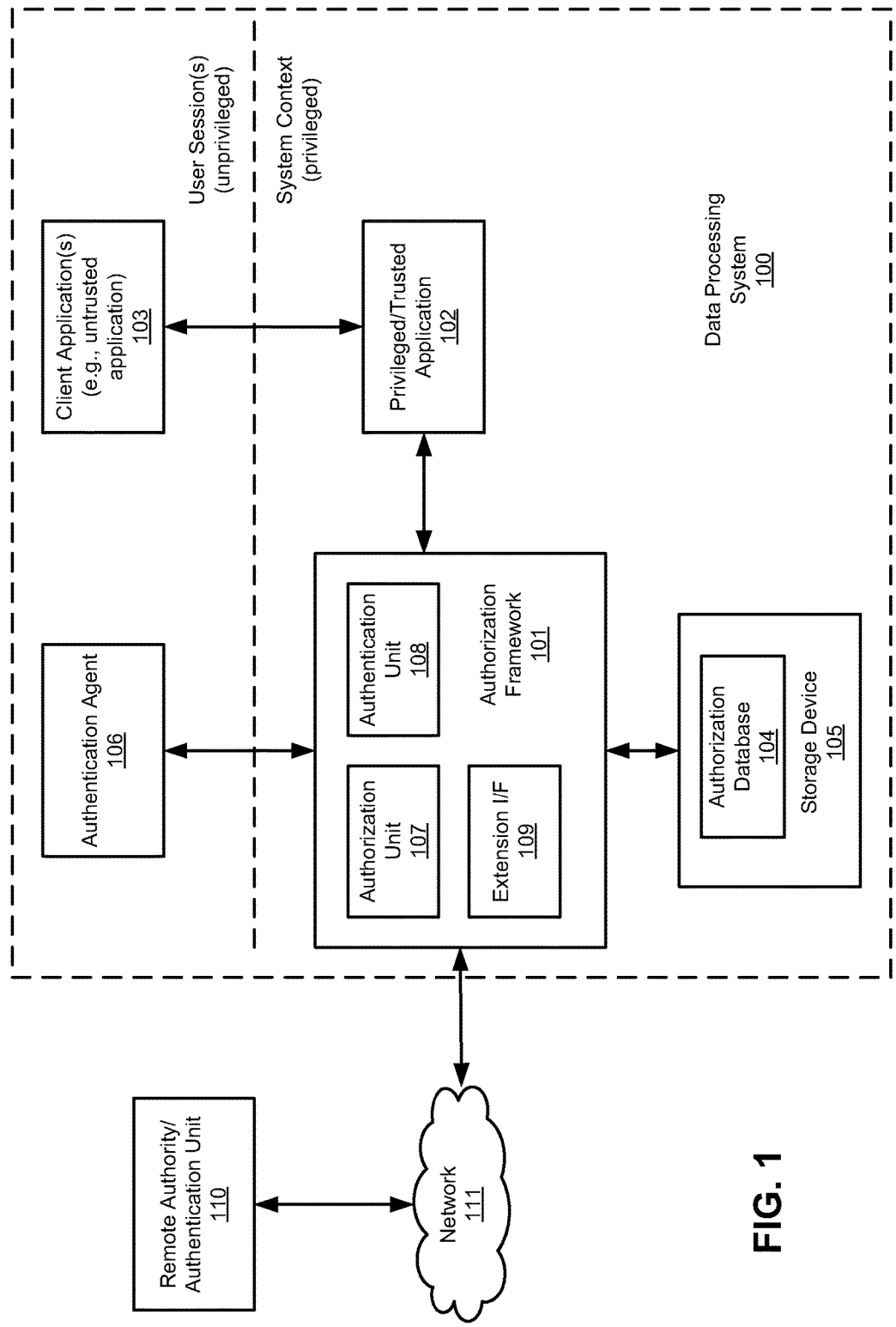
FIG. 1 is a block diagram illustrating a system having an authorization framework according to one embodiment.

FIG. 1 is a block diagram illustrating a system having an authorization framework according to one embodiment. For example, system 100 may be a client computer (e.g., desktop or laptop) or a server computer. Referring to FIG. 1, according to one embodiment, system 100 includes an authorization framework 101 to be accessed by a privileged or trusted application 102 via an authorization API, which may be implemented as a part of IPC or system bus mechanism (e.g., D-bus or UNIX pipes). Privileged/trusted application 102 may be any system component that is trusted by the system 100, which is running within the trusted system context. For example, privileged/trusted application 102 may be provided by an operating system vendor or alternatively, a third party application that is certified by the operating system vendor. Privileged/trusted application 102 may provide a service or services (e.g., mounting a disk drive) to an unprivileged application 103 as a client within system 100 or alternatively, application 103 may be an application running at a remote host communicatively coupled to the system 100.

In one embodiment, when client 103 communicates with privileged application 102 for accessing a service provided by the privileged application 102, privileged application 102 communicates with authorization framework 101 to determine whether client 103 is authorized for accessing the requested service. In response, authorization unit 107 is configured to authorize client 103 in view of one or more policies stored in the authorization database 104. The authorization database 104 may be implemented in one or more databases and stored in a storage device 105, which may be located locally or remotely over a network.

When privileged/trusted application 102 communicates with authorization framework 101, certain information for identifying client 103 may also be communicated to the authorization framework 101, such as, for example, a user identifier (ID) identifying a user of a client application, a process ID identifying a client application, a session ID identifying a user or desktop session within which the client application is running, and/or an action ID identifying an action to be carried out by the privileged/trusted application 102. Certain OS specific attributes such as security context may also be included. Based on such information, authorization unit 107 examines one or more policies stored in authorization database 104 in order to determine whether client 103 is authorized to access a particular service (e.g., action) carried out by the privileged/trusted application 102. The trusted application 102 may have registered or declared certain actions and the required privileges associated with the actions with the authorization framework, which may be stored in the authorization database 104.

The result of the authorization process may be a "yes" which indicates that the requested action should be carried out by the trusted application 102. Alternatively, the result of the authorization process may be a "no" which indicates that the requested action should not be carried out by the trusted application 102. Further, the result of the authorization process may be an "authentication required" which indicates that the requested action should only be carried out by the trusted application 102 if the user of the client application has been successfully authenticated. According to one embodiment, the privileged/trusted application 102 may specify or include an attribute indicating whether a user interaction is allowed. If no user interaction is allowed, there is no authentication happened and only in this situation will it receives the "authentication required" result. However, if the user interaction is allowed, it may not receive the "authentication required" result, but the authentication determination performed on the authorization framework 101 could take a relatively long period of time. According to one embodiment, the privileged/trusted application 102 can also cancel or terminate the authorization determination process performed via the authorization framework 101 if such a process takes too long.

Figure 2B:
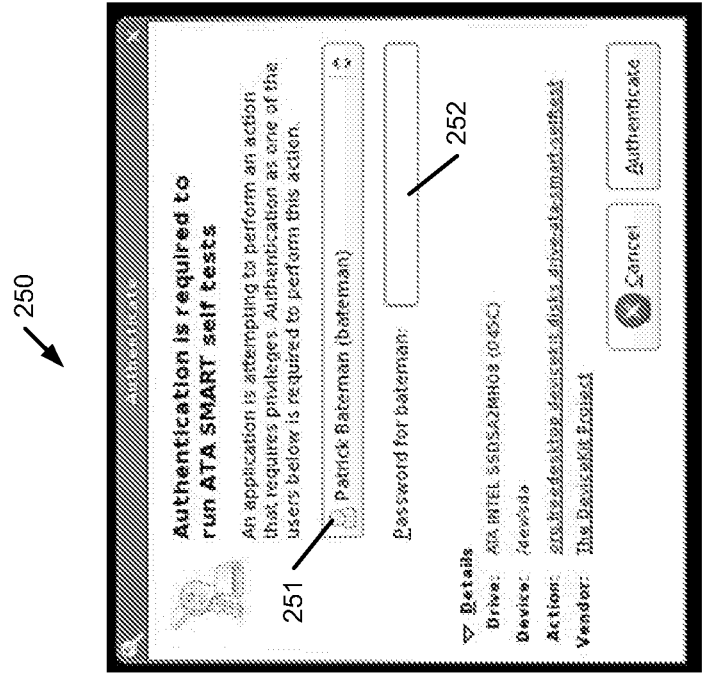
FIGS. 2A-2B are screenshots illustrating a graphical user interface for authenticating a user.
Figure 2A:
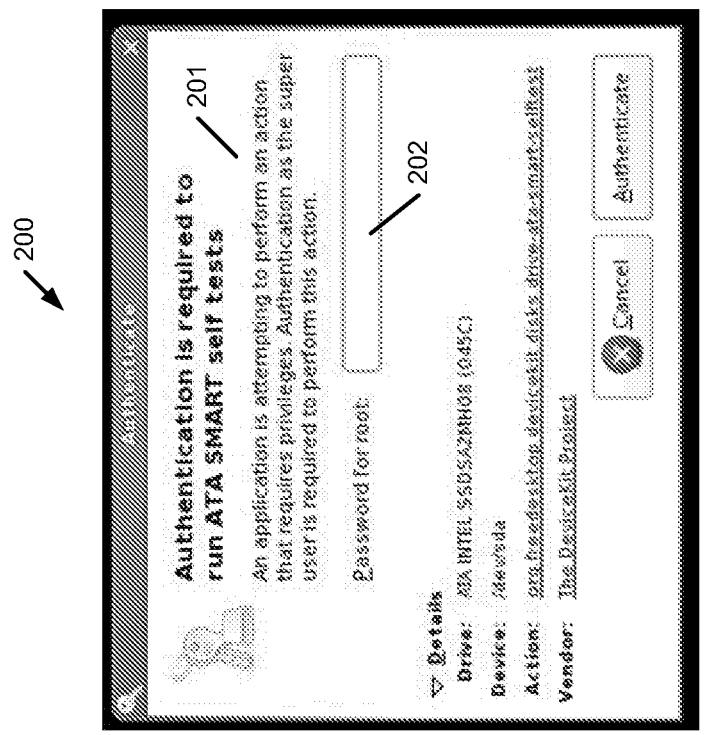

If it is determined that client 103 is authorized to access the requested service, but would require authentication, authorization framework further determines whether a user associated with client 103 should be authorized to access the requested services by authenticating the user. In some situations, a client machine can be a workstation that is shared by multiple users with different privileges (e.g., regular user, super user, or administrator privilege). If it is determined that the user of client 103 needs to be authenticated, authentication unit 108 invokes an authentication agent 106 which is running within the same user session of client 103, which may be identified by a session ID. Authentication agent 106 may display a dialog box, such as dialog boxes as shown in FIGS. 2A-2B, for prompting the user to enter certain credentials to authenticate the user itself. Based on the credentials entered by the user, authentication unit 108 is configured to authenticate the user in view of authentication information stored in database 104. If the user is successfully authenticated, authorization framework 101 returns a value to privileged/trusted application 102 indicating whether the requested service is authorized to be carried out by the privileged/trusted application 102. Note that authorization framework 101 may be a core component of an operating system running within system 100. Note that the authentication agent 106 can run on a completely separate device communicatively coupled to system 100 via a communication link, wired or wireless. For example, an authentication agent may be a separate device having a small display and a button (e.g, cellular phone) that is coupled to system 100 via a universal serial bus (USB) connection. In some situations, the authentication agent is designed to not require a password—merely pressing a single button would be sufficient for authentication. In other situations, it may ask for passwords or other kinds of authentication (e.g., checking fingerprint, etc.) Also note that although authentication agent 106 is related to a user session, it may not necessarily be part of the user session of client 103. The authentication agent 106 can serve one or more user sessions.

In addition, authorization framework 101 includes one or more extension interfaces 109 to allow third-party vendors and/or sites to implement certain extensions to further control authorization policies. For example, a third-party authority may be authorization framework 110 implemented either locally (as part of computer system 100) or remotely (as part of a different computer system) over network 111, which may be a local area network (LAN), a wide area network (WAN), or a combination of both LAN and WAN.

Thus, authorization framework 101 provides an authorization API to be used by privileged/trusted application 102 offering services to unprivileged application 103 through some forms of IPC mechanisms such as D-bus or UNIX pipes. The privileged application 102 typically treats client 103 as an untrusted application. For every request received from client 103, privileged/trusted application 102 needs to determine if the request is authorized or privileged/trusted application 102 should refuse to service client 103. By using the authorization API, privileged/trusted application 102 can offload the authorization and/or authentication process to authorization framework 101.

In addition to acting as an authority, authorization framework 101 allows a user to obtain a temporary authorization through authenticating either an administrator or an owner of the user session associated with client 103. This is useful for scenarios where a privileged/trusted application needs to verify that the operator of client 103 really is the user or really is an administrator. Authentication agent 106 is used to request a user of a user session to prove that the user of the session really is the user (by authenticating as the user) or an administrative user (by authenticating as an administrator).

In one embodiment, authentication agent 106 may provide a graphical user interface (GUI) as shown in FIGS. 2A-2B. Referring to FIG. 2A, GUI 200 is designed to inform a user in a message 201 that an application is attempting to perform an action that requires privileges and the user has to be authenticated as a super user by entering a password associated with a super user in field 202 for the purpose of authenticating the user. Alternatively, as shown in FIG. 2B, if the system is configured without a "root" account, GUI 250 may be used to allow a user to select one of the predetermined users in field 251 and to enter an associated password in field 252 for the purpose of authenticating the user.

Components 101-102 can be implemented as core components of an operating system (OS). Component 102 may be a third party application that is certified by a vendor of the operating system running within system 100. Authentication can be specified (in a return value) as either user authentication (e.g., user enters its own password) or super user authentication (e.g., user enters the root password or a user in an administrator group authentication). The authorization can be maintained: 1) indefinitely (e.g., it persists across multiple user sessions or reboot); 2) for the remainder of the desktop session; and 3) within a period of time (e.g., a life-time of a particular process). Note that some or all of the components as shown in FIG. 1 may be implemented in software, hardware, or a combination of both.

FIG. 3 is a flow diagram illustrating a method for authorizing access of a privileged application according to one embodiment. Note that method 300 may be performed by processing logic which may include software, hardware, or a combination of both. For example, method 300 may be performed by authorization framework 101 of FIG. 1. Referring to FIG. 3, at block 301, a request is received via an authorization API from a trusted application for authorizing a client application for access a service provided by the trusted application. In response to the request, at block 302, an authorization unit determines whether the client application is authorized to access the trusted application in view of policies. If authentication is needed, at block 303, an authentication unit invokes an authentication agent associated with a user session of the client application via a system API to request a user to enter the necessary credentials to authenticate the user (e.g., either a super user or an administrator). Based on the credentials entered, at block 304, the user is authenticated and at block 305, the authorization framework returns a value to the trusted application indicating whether the client/user is authorized for accessing the service provided by the trusted application.

Figure 4:
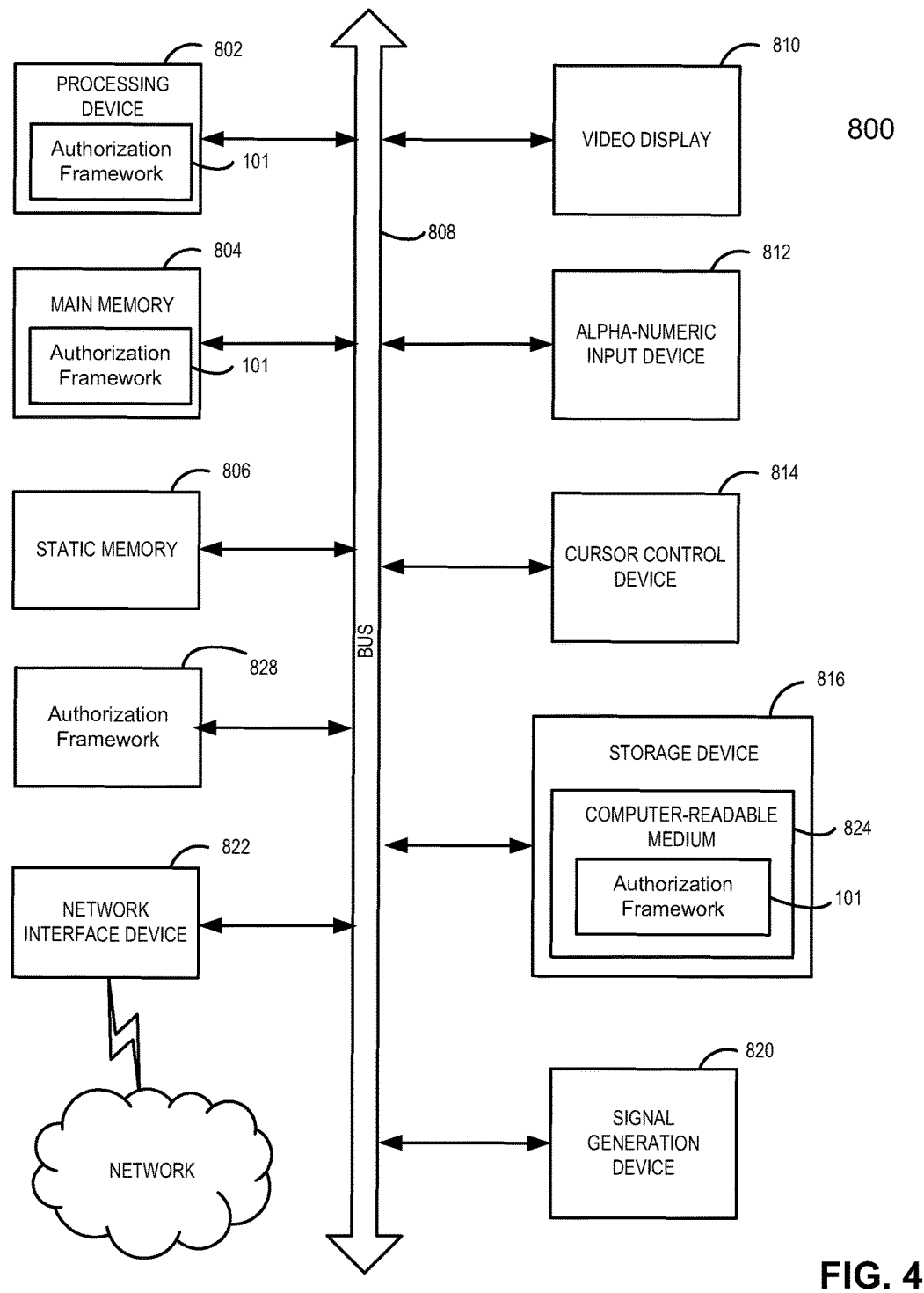
FIG. 4 illustrates a diagrammatic representation of a machine in the exemplary form of a computer system which may be used with an embodiment of the invention.

FIG. 4 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a data storage device 816, which communicate with each other via a bus 808.

Processing device 802 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute the instructions 101 for performing the operations and steps discussed herein.

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The data storage device 816 may include a computer-accessible storage medium 824 (also known as a machine-readable storage medium or a computer-readable medium) on which is stored one or more sets of instructions or software (e.g., authorization framework 101) embodying any one or more of the methodologies or functions described herein. The authorization framework 101 may also reside, completely or at least partially, within the main memory 804 and/or within the processing device 802 during execution thereof by the computer system 800, the main memory 804 and the processing device 802 also constituting machine-accessible storage media. The authorization framework 101 may further be transmitted or received over a network via the network interface device 822.

The computer-readable storage medium 824 may also be used to store the authorization framework 101 persistently. While the computer-readable storage medium 824 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The modules 828, components and other features described herein can be implemented as discrete hardware components or integrated in the functionality of hardware components such as ASICS, FPGAs, DSPs or similar devices. In addition, the modules 828 can be implemented as firmware or functional circuitry within hardware devices. Further, the modules 828 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving" or "authorizing" or "authenticating" or "returning" or "invoking" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A method of performing an authorization for access to a service offered by a trusted application comprising:
    receiving, by an authorization framework executed by a processing device, a request from the trusted application to authorize a client application that requests the service offered by the trusted application, wherein the request identifies the client application and an action to be carried out by the trusted application;
    determining, in view of the request, whether the client application is authorized to access the trusted application in view of an authorization policy;
    causing an authentication of a user of the client application in response to determining the client application is authorized to access the trusted application; and
    returning, by the authorization framework and to the trusted application, an authorization result in view of the determining and the authentication that indicates to the trusted application whether to offer the client application the service and whether to carry out the action.

2. The method of claim 1, wherein the trusted application is a software application to offer the service to the client application, and wherein the service requested by the client application is other than authorization and authentication.

3. The method of claim 1, wherein the request identifies the user of the client application.

4. The method of claim 1, wherein causing the authentication of the user comprises invoking an authentication agent to collect one or more credentials from the user that are used to access the service.

5. The method of claim 4, wherein the user accesses the client application within a session, and wherein the authentication agent runs in the session.

6. The method of claim 4, wherein the user accesses the client application within a session, and wherein the authentication agent runs outside the session.

7. The method of claim 4, wherein the one or more credentials comprise a fingerprint.

8. The method of claim 4, wherein the authentication agent is to display a graphical user interface to obtain the one or more credentials from the user, and wherein the one or more credentials comprise a credential associated with a super user that is used to access the service.

9. The method of claim 4, wherein the authentication agent is to display a graphical user interface that enables the user to select a predetermined authorized user and a credential associated with the predetermined authorized user that is used to access the service.

10. The method of claim 1, further comprising accessing a different authority to perform at least one of additional authorization of the client application or additional authentication of the user.

11. A non-transitory computer-readable medium comprising instructions that, responsive to execution by a processing device, cause the processing device to perform operations comprising:
    receiving, by an authorization framework executed by the processing device, a request from a trusted application to authorize a client application that requests a service offered by the trusted application, wherein the request identifies the client application and an action to be carried out by the trusted application;
    determining, in view of the request, whether the client application is authorized to access the trusted application in view of an authorization policy;
    causing an authentication of a user of the client application in response to determining the client application is authorized to access the trusted application; and
    returning, by the authorization framework and to the trusted application an authorization result in view of the determining and the authentication that indicates to the trusted application whether to offer the client application the service and whether to carry out the action.

12. The non-transitory computer-readable medium of claim 11, wherein the trusted application is a software application to offer the service to the client application, and wherein the service requested by the client application is other than authorization and authentication.

13. The non-transitory computer-readable medium of claim 11, wherein the request identifies the user of the client application.

14. The non-transitory computer-readable medium of claim 11, wherein causing the authentication of the user comprises invoking an authentication agent to collect one or more credentials from the user that are used to access the service.

15. The non-transitory computer-readable medium of claim 14, wherein the user accesses the client application within a session, and wherein the authentication agent runs outside the session.

16. The non-transitory computer-readable medium of claim 14, wherein the one or more credentials comprise a fingerprint.

17. A system to perform an authorization for access to a service offered by a trusted application comprising:
   a memory; and
   a processing device, operatively coupled to the memory, to:
      receive, by an authorization framework executed by the processing device, a request from the trusted application to authorize a client application that requests the service offered by the trusted application, wherein the request identifies the client application and an action to be carried out by the trusted application;
      determine, in view of the request, whether the client application is authorized to access the trusted application in view of an authorization policy;
      cause an authentication of a user of the client application in response to determining the client application is authorized to access the trusted application; and
      return, by the authorization framework and to the trusted application, an authorization result in view of the determining and the authentication that indicates to the trusted application whether to offer the client application the service and whether to carry out the action.

18. The system of claim 17, wherein the request identifies the user of the client application.

19. The system of claim 17, wherein to cause the authentication of the user, the processing device to invoke an authentication agent to collect one or more credentials from the user that are used to access the service, and wherein the authentication agent runs outside a session that the user uses to access the client application.

20. The system of claim 19, wherein the one or more credentials comprise a fingerprint.

* * * * *